United States Patent [19]
Kleiman et al.

[11] 3,777,254
[45] Dec. 4, 1973

[54] NUCLEAR MAGNETIC RESONANCE SPECTROMETER WITH JOINTLY FUNCTIONING EXTERNAL AND INTERNAL RESONANCE STABILIZATION SYSTEMS

[76] Inventors: Jury Lvovich Kleiman, Fontanka, 126, kv. 25; Nikolai Viktorovich Morkovin, Krasnoputilovskaya, 53, kv. 43; Vladimir Antonovich Pavlenko, ulitsa Tipanova, 5, kv. 77, all of Leningrad, U.S.S.R.

[22] Filed: Mar. 12, 1971

[21] Appl. No.: 123,915

Related U.S. Application Data

[63] Continuation of Ser. No. 789,887, Jan. 8, 1969, abandoned.

[30] Foreign Application Priority Data
Jan. 15, 1968  U.S.S.R............................ 1,210,942

[52] U.S. Cl................................................ 324/.5 R
[51] Int. Cl. ........................................... G01n 27/78
[58] Field of Search .............. 324/.5 R, .5 A, .5 AC, 324/.5 MA, .5 H

[56] References Cited
UNITED STATES PATENTS
3,388,322  6/1968  Anderson............................... 324/.5
3,427,532  2/1969  Nelson.................................. 324/.5

Primary Examiner—Michael J. Lynch
Attorney—Waters, Roditi, Schwartz & Nissen

[57] ABSTRACT

A nuclear magnetic resonance spectrometer comprising an electromagnet accommodated in a housing with coils disposed within the magnetic field between the poles of the electromagnet. The electrical axes of the coils are oriented perpendicularly to the pole faces of the electromagnet. The coils are connected to the output of an internal nuclear magnetic resonance stabilization system. An analytical nuclear magnetic resonance probe is disposed in the zone defined by the coils and connected to the input of the internal nuclear magnetic resonance stabilization system. A reference nuclear magnetic resonance probe is disposed within the magnetic field of the electromagnet and is located so as to be outside the zone defined by the coils. An external nuclear magnetic resonance stabilization system is connected to the reference nuclear magnetic resonance probe and nuclear magnetic resonance signals derived from the analytical nuclear magnetic resonance probe are recorded. The external and internal stabilization systems operate simultaneously.

3 Claims, 1 Drawing Figure

PATENTED DEC 4 1973          3,777,254
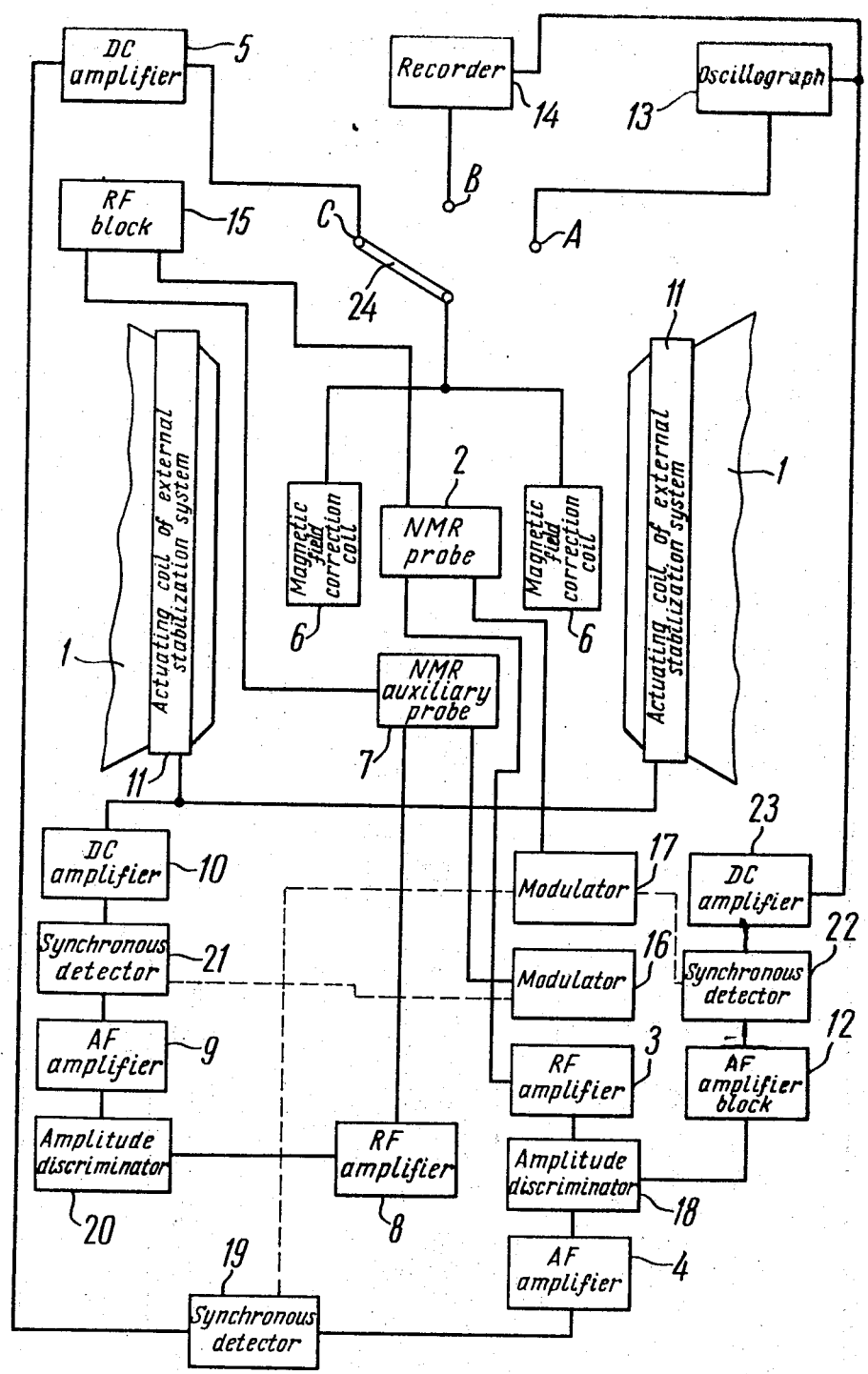

NUCLEAR MAGNETIC RESONANCE SPECTROMETER WITH JOINTLY FUNCTIONING EXTERNAL AND INTERNAL RESONANCE STABILIZATION SYSTEMS

This Application is a continuation of copending application Ser. No. 789,887 filed Jan. 8, 1969 and now abandoned.

The present invention relates to spectrometers operating on the principle of nuclear magnetic resonance.

Known in the art are nuclear magnetic resonance spectrometers (NMR spectrometers) comprising NMR analytical and reference probes placed within the magnetic field of the magnet pole gap. The NMR analytical probe serves an an input member of the NMR control system for the internal stabilization of the magnetic field, the output member of said control system being constituted by coils disposed on the magnet poles. The NMR reference probe serves as an input member of the NMR control system for the external stabilization of the magnetic field whose output member is constituted by the abovementioned coils which are included, as stated above, in the NMR control system adapted for the internal stabilization of the magnetic field (see, for example, JNM–3H–60 High Resolution NMT Instruments manufactured by the Japan Electron Optics Laboratory Co., Ltd).

The external stabilization system of said NMR instruments ensures the magnetic field stability sufficient for solving the majority of everyday problems in NMR spectroscopy. However, when performing precision experiments in which the accuracy of measuring chemical shifts or spin-spin splittings should be better than 0.2–0.1 cps, in case the speed of spectrum recording is less than 0.2–0.1 cps/sec, and in some other experiments the internal stabilization NMR control system is to be used.

An essential disadvantage of the aforesaid NMR instruments resides in that their internal and external stabilization NMR control system cannot operate simultaneously, since the same coils are employed as the output members thereof. For the instrument to be operable with the internal stabilization system its external stabilization system should be cut off. Considerable time is required for making the internal stabilization system operative again, since the choice of the line to be used for stabilization and the feeding of this line signal into the circuit are carried out under the conditions of a relatively low stability and, as a matter of fact, almost gropingly. As to the resolution control, replacement of the samples etc, all such operations are to be performed either without the stabilization of the resonance conditions, or after the instrument has been switched over to operate with the external stabilization system. These factors involve considerable waste of time and are responsible for a sharp decrease in the efficiency of labour.

It is therefore an object of the present invention to eliminate the above disadvantages.

The principal object of the present invention is to provide a NMR instrument which will ensure simultaneous operation of the external and internal NMR stabilization systems with a minimum time required for passing over from one type of work to another.

Said specific object is accomplished due to the fact, that in the present NMR spectrometer comprising an analytical NMR probe and a reference NMR probe placed within the field of a magnet, of which the first probe is connected with the internal NMR stabilization system and the second with the external NMR stabilization system, according to the invention, arranged within the magnetic field of the magnet are magnetic field correction coils that are connected with the output of the internal stabilization system, the electrical axes of said coils being oriented perpendicular to the magnet pole faces, the analytical NMR probe being disposed within the zone defined by said coils, and the reference NMR probe being arranged outside zone.

Such a constructive location of the probes and actuating elements of the external and internal NMR stabilization systems insures simultaneous functioning of these systems, since there exists only a weak connection between the stabilization systems.

The connection in this case is to be understood as follows. Fluctuations in one of the systems, e.g. in the internal system, cause a stabilizing reaction therein. This reaction due to the presence of the weak connection causes fluctuations in the other systems (external). The reaction of the actuating coils of the external stabilization system causes a reduction of fluctuations in the sample under test.

Given hereinbelow is a description of an exemplary embodiment of the instrument of the invention, to be had in conjunction with the accompanying drawing, wherein the block-diagram of the NMR spectrometer is presented.

The spectrometer according to the invention comprises an electromagnet 1, systems of external and internal stabilization, a main NMR probe 2, an auxiliary NMR probe 7, a high-frequency unit for irradiating the samples of said probes with high-frequency energy at a resonance frequency, modulators and a device for registering the NMR signals, and a device (not shown in the drawing) for controlling the temperature of the sample under test during temperature tests.

The internal NMR stabilization system consists of a RF amplifier 3 connected to NMR probe 2. The output of the RF amplifier is connected via an aplitude discriminator or detector 18 to the input of an AF amplifier 4, the output of which is connected via a synchronous detector 19, to the input of a d.c. amplifier 5. Connected to the output of the amplifier 5 are coils 6 adapted to correct the magnetic field and disposed within the magnetic field between the poles of the electromagnetic 1, the axes of said coils being oriented perpendicular to the pole faces of the electromagnet 1. The NMR probe 2 is located so as to be within the zone defined by the coils 6.

The external NMR stabilization system comprises an RF amplifier 8 whose input is connected to auxiliary or reference NMR probe 7. The output of RF amplifier 8 is connected, via an amplitude detector 20, to the input of an AF amplifier 9, whose output is connected via a synchronous detector 21 to the input of a d.c. amplifier 10. The output of the d.c. amplifier 10 is connected with the actuating coils 11 of the external stabilization system which are arranged on the poles of the electromagnet 1. The NMR probe 7 is located so as to be outside the zone defined by the coils 6.

The device for recording the NMR signals comprises a recorder 14 and an oscillograph 13 connected, via a d.c. amplifier 23 and a synchronous detector 22, to the block of AF amplifiers 12. The block of amplifiers 12 is coupled, via the amplitude detector 18 and the RF amplifier 3 forming a part of the internal stabilization system, with the NMR probe 2.

RF current required for the NMR conditions is generated in block 15 whose output is connected with the RF circuits of the NMR probes 2 and 7. The NMR signals are AF-modulated by the current produced in the modulators 16 and 17 whose outputs are connected respectively to the NMR probes 7 and 2.

The operation of the NMR instrument of the present invention is as follows.

After the instrument has been switched on, a test tube accommodating a sample to be investigated is placed into the NMR probe 2. When working with the external stabilization system, the magnetic field correction coils 6 are connected by the switch 24 to the output of the oscillograph 13. (in the drawing this position of the switch 24 is shown at "A"). The choice of the spectrum portion to be recorded, the resolution adjustment and the setting of the optimum level of the RF and modulation frequency voltages, etc are carried out with the visual observation of the screen of the oscillograph 13.

The field sweep scale having been adjusted by observation of the oscillograph magnetic field correction, the coils 6 are switched over to the recorder 14 (position "B") and the spectrum is graphically recorded on the chart paper. The current magnitude in the coils 6 and, hence, the field intensity within the volume of the sample vary in synchronism with the travel of the chart paper along the X-axis.

The NMR signal of the probe 7 is amplified and converted by the elements 8, 20, 9, 21 and 10 of the external stabilization system and then is fed to the actuating coils 11 of the external stabilization system, thus compensating for the fluctuations which may be caused by the instability of the winding current of the electromagnet 1, by electrical transport facilities, or by random movement of steel objects in the vicinity of the instrument, etc.

Should the necessity arise in determining the position of the lines in the spectrum relative to the line of the reference specimen or to any other line in the spectrum with an accuracy of ± 0.1 cps or higher, the internal stabilization system is to be used.

To obtain instrument operation with the internal stabilization system it will suffice to adjust the line of the spectrum whose signal is selected to be used as, the input co-ordinate in the internal stabilization system so that it be in the centre of the screen of the oscillograph 13, and then to switch over the coils 6 to the output of the amplifier 5 (position "C").

The signal of said line after being amplified and converted by the elements 3 and 18 of the internal stabilization system and by elements 12, 22, 23, 13 or 12, 22, 23 and 14, is fed to the magnetic field correction coils 5, thus compensating for the fluctuations of the NMR conditions with an accuracy higher than that ensured by the external stabilization system.

Greater accuracy is attained dur to the fact that the source of signals being recorded is confined in space to one sample to be investigated, as well as due to the fact that the source of the stabilizing signal (reference signal) is constituted by a narrow line of high-resolution NMR.

The NMR spectrum is recorded by sweeping the modulation frequency, while the signal of the line employed for stabilization is modulated by a stable frequency current.

During the operation of only the external stabilization system, the field sweep is effected with the aid of the current, for instance, in the magnetic field correction coils 6, between which is located the NMR probe with the sample under test. Outside the zone defined by the magnetic field correction coils 6 several millimeters away from their edge is disposed the reference NMR probe 7 connected with the external stabilization system.

When switching over to operating with internal stabilization, the magnetic field correction coils 6 are reconnected to the output of the internal stabilization system and serve as an actuating unit correcting the intensity of the field, while the recording of spectra is effected with the aid of frequency sweeping.

The influence of one system on the other is practically insignificant. The slight influence which yet takes place is compensated by the fact that the power lines of the magnetic flux in the coils 6 near the NMR probes 2 and 7 are oppositely directed. Consequently, the current in the magnetic field correction coils 6 causes such a reaction of the external stabilization system which coincides with the stabilizing effect of the internal stabilization system in the zone of the sample under test and is opposite to said effect in the zone of the auxiliary sample.

If some external fluctuations occur for some reason in the zone of the sample under test (when working with external NMR stabilization) a current will appear in the magnetic field correction coils 6, which will compensate for these fluctuations. The resulting change of the NMR in the zone of the external auxiliary sample will be compensated by the current in the actuating coils 11 of the external stabilization system. At the same time the current in the magnetic field correction coils 6 will somewhat drop, since the fluctuations in the internal stabilization system will be partly subdued by the field of the actuating coils of the external stabilization system. The balance is established when the current in the magnetic field correction coils 6 produces for the auxiliary probe 7 a field whose value is equal to that of the correcting effect of the external stabilization system.

Considerable advantages featured by the NMR instrument of the present invention become quite apparent when analyzing spectral patterns with considerable shifts between separate lines thereof, or spectrum groups, such as the NMR of fluorine. In this case precise determination of the position of the lines in each spectrum group can be effected only by analyzing each stabilizing line in succession, since usually the frequency sweep range does not exceed 1 to 2 thousand cps.

The design of the instrument of the present invention ensures a rapid conversion from one type of stabilization to the other, with the external stabilization operating continuously.

As a result, the efficiency when using the proposed instrument for such kind of work proves to be much higher than that offered by the NMR instruments known heretofore.

The present NMR instrument is ideal for investigating temperature dependence factors, when the stability ensured by the external stabilization diminishes to a certain extent, when the amount of auxiliary operations to be performed with the external stabilization (such as replacement of samples at a given temperature, preliminary procedures, etc) increases while the accuracy of determining the changes in the position of the lines should be extremely high.

An essential advantage of the present instrument resides in that the choice of the reference line, adjustment of the resolution, preliminary determination of the shift of this line relative to the spectrum portion to be investigated, and the like operations are performed with the external stabilization, the internal stabilization system being made operative by mere switching over of the magnetic field correction coils 6 to the output of the d.c. amplifier 5.

The replacement of the samples with the use of the same line as the reference requires no additional operations, since with the sample removed, the NMR conditions remain practically unchanged due to the continuous operation of the external stabilization system.

We claim:

1. A nuclear magnetic resonance spectrometer with jointly functioning external and internal NMR stabilization systems comprising an electromagnet, said electromagnet having poles with pole faces, magnetically responsive correction coils disposed between said poles and having an axis perpendicularly orientated with respect to said pole faces, an internal nuclear magnetic resonance stabilization system having an output and an input, said correction coils being connected to said output of said internal stabilization system, an analytical nuclear magnetic resonance probe, said analytical probe being disposed within a zone defined by said coils and connected to said input of said internal stabilization system, a reference nuclear magnetic resonance probe, said reference probe being disposed within the magnetic field of said electromagnet, said reference probe being located outside said zone defined by said coils, an external nuclear magnetic resonance stabilization system, said external system being connected to said reference probe, a radio-frequency source, said radio-frequency source being connected to said analytical and said reference probes and producing a signal at a resonant frequency for irradiating samples of said probes, a pair of modulators, each of said modulators being connected to a respective one of said probes, means to record the signal produced by said analytical nuclear magnetic resonance probe, and further correction coils arranged on the poles of said electromagnet and connected to the output of the external stabilization system.

2. A nuclear magnetic resonance spectrometer as claimed in claim 1, wherein said external system includes an RF amplifier having an input and an output, an amplitude discriminator, an AF amplifier, a synchronous detector, and a d.c. amplifier, said reference probe being connected to said input of said RF amplifier, said output of said RF amplifier being connected to said further correction coils through a series connection of said amplitude discriminator, said AF amplifier, said synchronous detector and said d.c. amplifier.

3. A nuclear magnetic resonance spectrometer as claimed in claim 2, wherein said internal system comprises an RF amplifier, an amplitude discriminator, an AF amplifier, a synchronous detector and a d.c. amplifier, said analytical probe being connected to said magnetically responsive coil through a series connection of said RF amplifier, said AF amplifier, said synchronous detector and said d.c. amplifier.

* * * * *